United States Patent
Bates

(10) Patent No.: US 7,644,653 B2
(45) Date of Patent: Jan. 12, 2010

(54) COFFEE MAKER BREW BASKET

(75) Inventor: Roy Bates, Glen Allen, VA (US)

(73) Assignee: Hamilton Beach Brands, Inc., Glen Allen, VA (US)

(*) Notice: Subject to any disclaimer, the term of this patent is extended or adjusted under 35 U.S.C. 154(b) by 86 days.

(21) Appl. No.: 11/059,886

(22) Filed: Feb. 17, 2005

(65) Prior Publication Data

US 2006/0180029 A1  Aug. 17, 2006

(51) Int. Cl.
*A47J 31/00* (2006.01)

(52) U.S. Cl. .............................. 99/295; 99/323; 99/306

(58) Field of Classification Search ........... 99/279–323; 210/473–482
See application file for complete search history.

(56) References Cited

U.S. PATENT DOCUMENTS

| | | | | |
|---|---|---|---|---|
| 3,068,777 | A | * | 12/1962 | Alfonza Pedalino ......... 99/305 |
| 3,374,897 | A | | 3/1968 | Martin |
| 3,490,356 | A | | 1/1970 | Peterson et al. |
| D225,077 | S | | 11/1972 | Martin et al. |
| 4,056,050 | A | * | 11/1977 | Brown .......................... 99/305 |
| 4,069,751 | A | | 1/1978 | Gronwick et al. |
| 4,099,453 | A | | 7/1978 | Kaplan |
| 4,108,053 | A | * | 8/1978 | Vink ............................ 99/306 |
| 4,149,454 | A | | 4/1979 | Kemp |
| 4,254,694 | A | | 3/1981 | Illy |
| 4,328,740 | A | * | 5/1982 | McDonough et al. ......... 99/295 |
| 4,360,128 | A | | 11/1982 | Neumann |
| 4,429,623 | A | | 2/1984 | Illy |
| 4,550,024 | A | * | 10/1985 | le Granse ...................... 426/77 |
| 5,190,652 | A | | 3/1993 | van Thoor et al. |
| D341,286 | S | | 11/1993 | Grykiewicz et al. |
| 5,287,797 | A | | 2/1994 | Grykiewicz et al. |
| 5,389,253 | A | * | 2/1995 | Cicconi ...................... 210/248 |
| D389,697 | S | | 1/1998 | Smit |
| 5,806,409 | A | | 9/1998 | Johnson et al. |
| D407,602 | S | | 4/1999 | Oatel |
| 5,967,019 | A | | 10/1999 | Johnson et al. |
| D423,284 | S | | 4/2000 | Fischer |
| D442,430 | S | | 5/2001 | Pope |
| D459,152 | S | | 6/2002 | Fischer et al. |
| D460,660 | S | | 7/2002 | Fischer et al. |
| 6,465,028 | B2 | | 10/2002 | Gutwein et al. |
| D486,355 | S | | 2/2004 | Lyall, III |
| 6,752,070 | B1 | * | 6/2004 | Lin .............................. 99/295 |
| 6,777,007 | B2 | | 8/2004 | Cai |

(Continued)

FOREIGN PATENT DOCUMENTS

CN  2652289 Y  11/2004

OTHER PUBLICATIONS

Chinese Office Action together with translation of cited Chinese patent; Application No. 200610008301.4; date of mailing of Apr. 25, 2008.

*Primary Examiner*—Timothy F. Simone
(74) *Attorney, Agent, or Firm*—Thomas, Raring & Teague, P.C.

(57) ABSTRACT

A brew basket for an automatic drip coffee maker has a funnel-shape with a relatively wide top end and relatively narrow bottom end. A stepped support ring is integral in and defines a ledge around a circumference of the brew basket. A coffee filter pod is supported on its periphery by the support ring during brewing.

18 Claims, 7 Drawing Sheets

U.S. PATENT DOCUMENTS

| | | |
|---|---|---|
| 6,786,134 B2 | 9/2004 | Green |
| 6,840,158 B2 * | 1/2005 | Cai .......................... 99/323.1 |
| 2001/0014361 A1 | 8/2001 | Gutwein et al. |
| 2003/0039731 A1 | 2/2003 | Dalton et al. |
| 2003/0207008 A1 | 11/2003 | Albrecht |
| 2003/0222089 A1 * | 12/2003 | Hale .......................... 220/912 |
| 2004/0005384 A1 | 1/2004 | Cai |
| 2004/0187696 A1 | 9/2004 | Halliday et al. |

* cited by examiner

COFFEE MAKER BREW BASKET

The present invention relates to a brew basket for an automatic drip coffee maker. Specifically, a brew basket is shaped to work with a soft pack filter pod of coffee.

BACKGROUND OF THE INVENTION

Automatic drip coffee makers are well known and widely used. They are effective to brew carafes of coffee, typically containing five to eight cups or more of liquid. Automatic drip coffee makers may also be used for brewing small batches (one to four cups), and some coffee makers include known modifications and adjustments to hot water flow rates to improve the quality of the brewed beverage in small batches.

An alternative to using loose coffee grinds placed in a filter is to simply place prepackaged filter packs into a brew basket. Prepackaged filter packs contain a predetermined amount of coffee grinds adapted to brew approximately four to six cups per pack. More than one filter pack may be used at a time depending on the quantity of coffee being brewed or on the specific taste of the consumer.

A recent coffee maker platform that has been developed uses single serving filter pods in a pressurized, hot water system. While these filter pods work well to brew coffee in these pressurized systems, there are challenges in the use of filter pods with an automatic drip coffee maker platform. For instance, a filter pod may float in water inside a brew basket or become tilted in a brew basket. The result is weak and inconsistent coffee, because water is able to go by and not through the filter pod containing the coffee grinds. Conventional automatic drip coffee maker brew baskets are not engineered to effectively accommodate filter pods.

SUMMARY OF THE INVENTION

Accordingly, it is an object of the present invention to overcome the difficulties in the use of filter pods with an automatic drip coffee maker type of system. Briefly, the improved brew basket is specially engineered to support a coffee filter pod during the brewing process to improve extraction and repeatability of the process.

In one example, an automatic drip coffee maker brew basket comprises a hollow, funnel-shaped brew basket having a relatively wide top end and a relatively narrow bottom end. Both the top and bottom ends are open to allow the flow of liquid through the basket. A stepped support ring is integral in and defines a ledge around a circumference of the brew basket, wherein the circumference is below the top end and above the bottom end. A coffee filter pod is then able to be supported on its periphery by the support ring during brewing.

In another example, an automatic drip coffee maker comprises a pod and a funnel-shaped brew basket. The pod comprises an amount of coffee material packaged within at least first and second sheets of filter web material. The sheets of filter web material are fixed to each other about their periphery and form a hollow space in between for placement of the coffee material. The pod includes a flange around the periphery where the first filter material is fixed to the second filter material. The hollow funnel-shaped brew basket has a relatively wide top end and a relatively narrow bottom end. Both the top and bottom ends are open to allow the flow of liquid through the basket. A stepped support ring is integral in and defines a ledge around the circumference of the brew basket when the circumference is below the top end and below the bottom end.

DETAILED DESCRIPTION

In order to overcome the problems of using coffee filter pods in existing drip coffee makers, the brew basket may be modified to include a support ring. The support ring is designed to hold the coffee filter pod in position to keep it from tilting or floating during the brew cycle. The support ring allows the filter pod to flow into the basket area during a brew cycle. The inside diameter of the support ring is designed to be large enough to provide enough flow rate of liquid through the pod to keep the pod from floating. The outside diameter of the ring is designed to be large enough to hold the largest size diameter of coffee filter pods that are commercially available.

Figure 1:
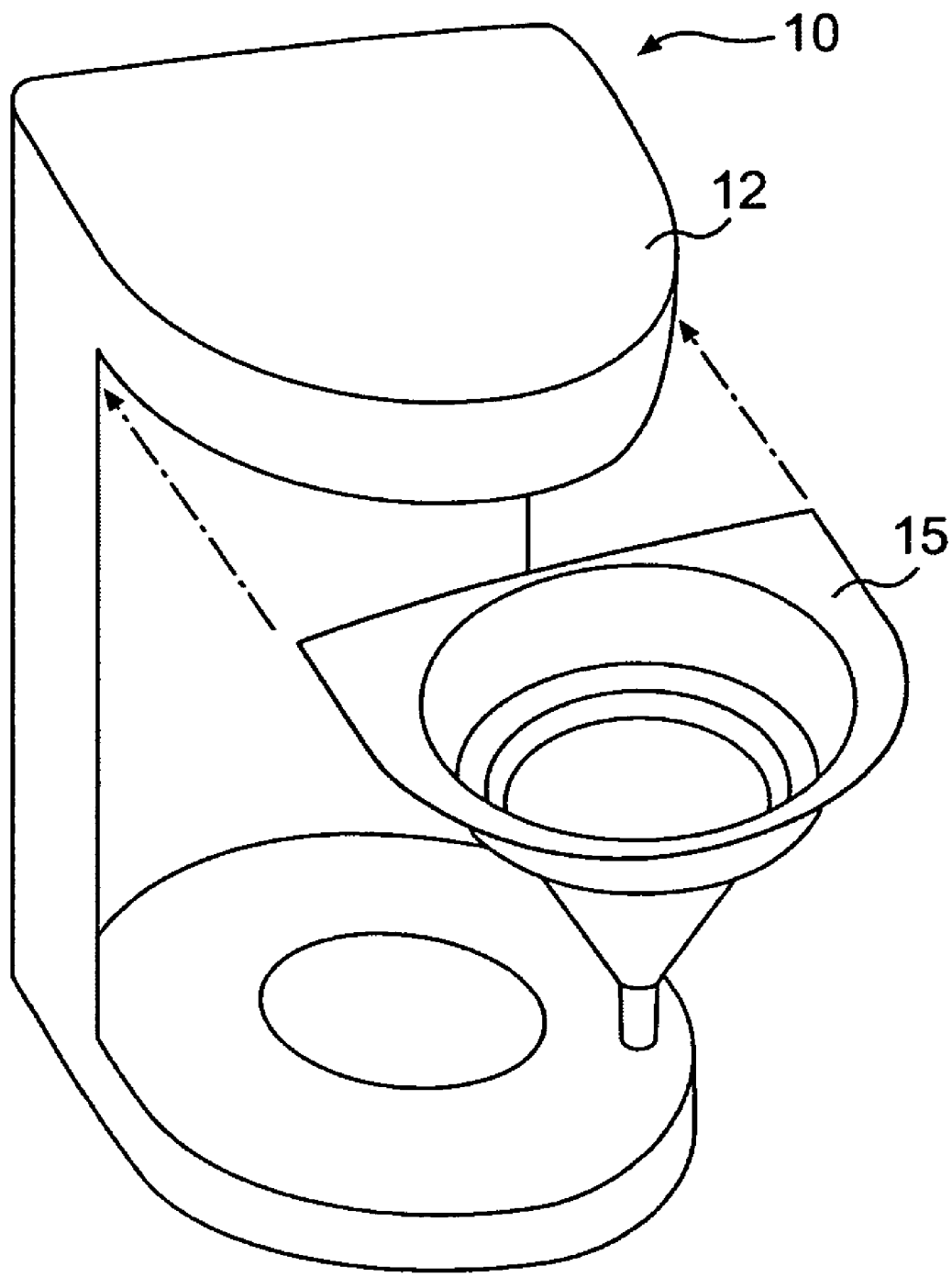
FIG. 1 is a perspective view of an automatic drip coffee maker type of device in which may be mounted a filter basket in accordance with the present invention.
Figure 2:
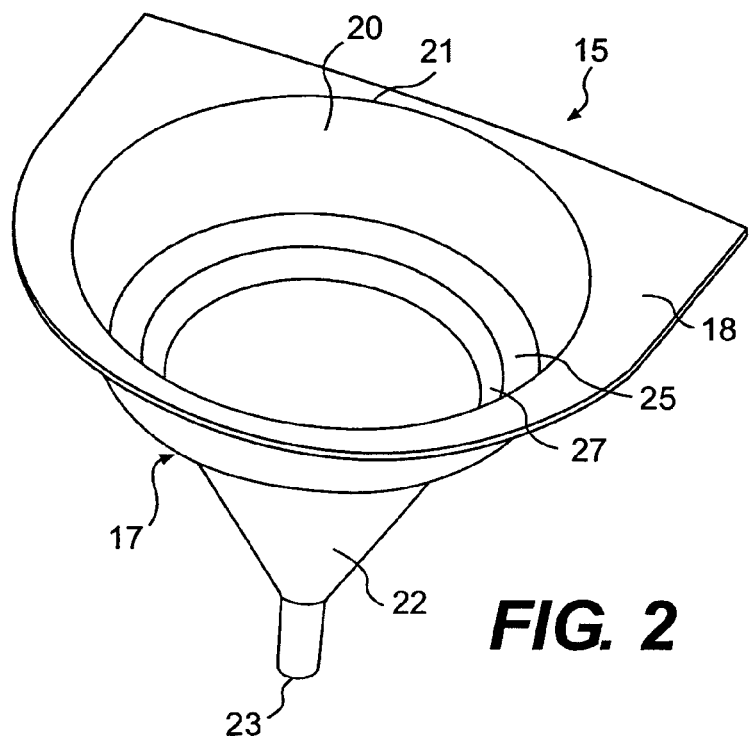
FIG. 2 is a perspective view of a filter basket in accordance with an example of the present invention.

FIG. 1 shows an automatic drip coffee maker 10 having an upper section 12 that is adapted to receive a brew basket 15. The brew basket 15 is removeably inserted into the coffee maker 10. In accordance with traditional, automatic drip coffee maker construction, the user will add fresh water to the coffee maker and place coffee grinds (or tea leaves) and a filter into the brew basket 15. The coffee maker 10 will heat the water and it will be supplied to the brew basket 15 from the upper portion 12 of the coffee maker 10. FIG. 1 is provided merely to show an environment of a coffee maker that may receive a brew basket. Of course, different constructions of brew basket in accordance with the present invention may be mounted within multiple different types and styles of automatic drip coffee maker.

FIGS. 2 through 5 illustrate different views of the same brew basket 15 shown in FIG. 1. The brew basket 15 includes funnel-shaped portions 17 and flange 18. The flange 18 is dimensioned and sized to be slideable into and out of a supporting lip in an automatic drip coffee maker. The simple, horizontal flange 18 is merely an example of one geometry that works with a particular prototype coffee maker.

The funnel-shaped portion 17 of the brew basket 15 includes a top end 20 and top opening defined by the upper edge 21 of the top end 20. There is also a bottom end 22 that includes an opening defined by the bottom edge 23 of the bottom end 22. As shown, the funnel-shaped brew basket 15 is relatively wider at the top end 20 than the bottom end 22.

The brew basket 15 is hollow to allow the flow of liquid through the basket. A horizontal cross section of the brew basket 15 is circular as shown (see, e.g., FIG. 4). However, other cross-sectional geometries are possible including, but not limited to, oval, racetrack, square, rectangular, or other symmetric and asymmetric geometries.

Figure 5:
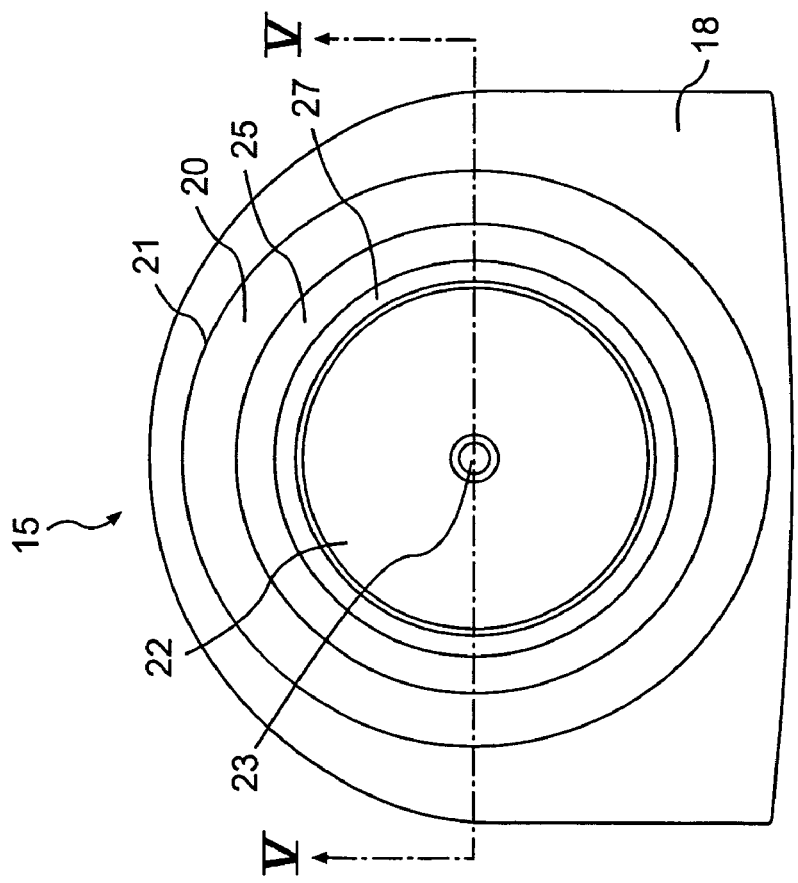
FIG. 5 is a side, cross-sectional view of the filter basket shown in FIGS. 2 and 4 taken along line V-V in FIG. 4.

The funnel portion 17 of the brew basket 15 further includes a ledge 25 that is a type of stepped support ring. The ledge 25 may be generally horizontal to the vertical orientation of the brew basket 15. Alternatively, as shown in FIG. 5, the ledge 25 is more flat than the angle of the top end 20 and the bottom end 22, but it still slopes downwardly at a gentle angle. The ledge 25 gradually turns into the bottom end 22 at a rounded portion 27. The transition edge of the portion 27 may be rounded or sharp. The ledge 25 is a transition between the top end 20 and the bottom end 22 of the funnel portion 17. The ledge 25 extends around the circumference of the brew basket 15 between the top and bottom ends 20 and 22 respectively. As shown, the ledge 25 defines a circular circumference around the brew basket 15, and specifically the funnel portion 17 that is in the shape of a cone.

Figure 3:
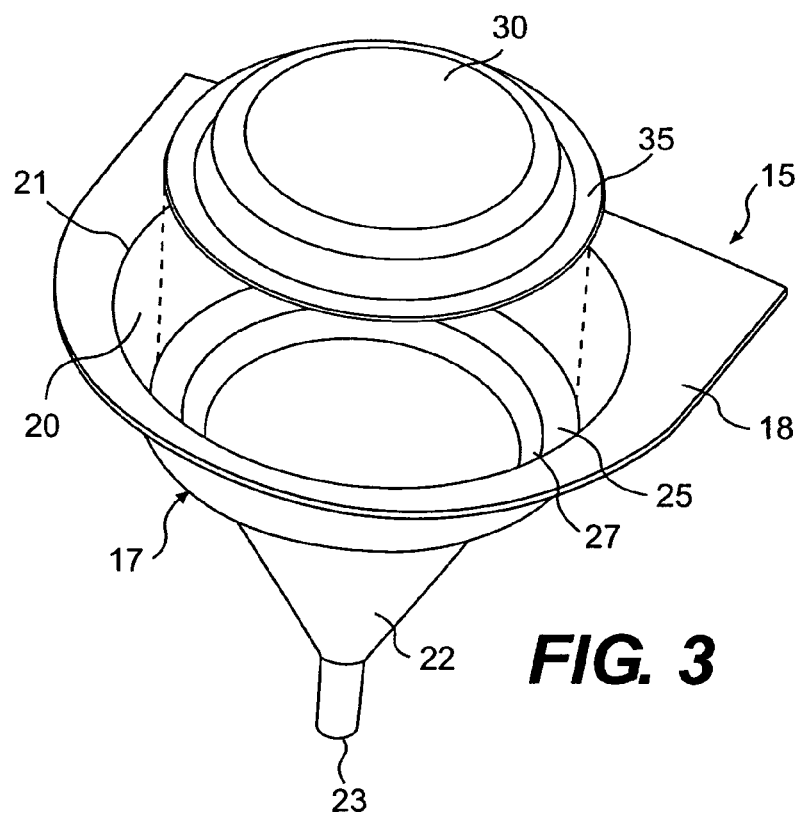
FIG. 3 is a perspective view of a filter basket as shown in FIG. 2 further showing a coffee filter pod.
Figure 4:
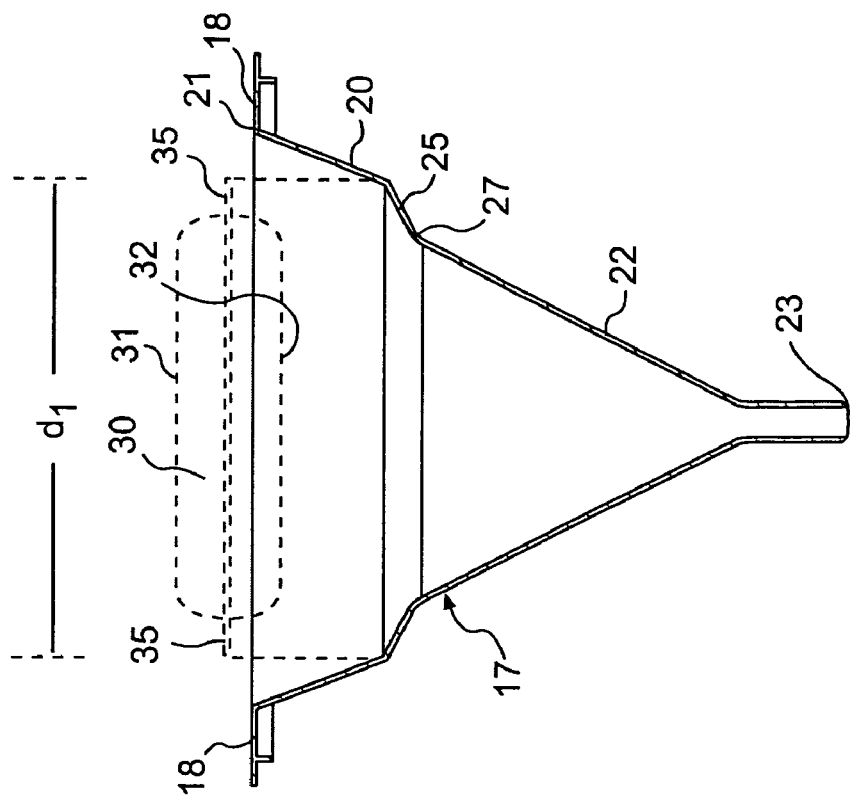
FIG. 4 is a top plan view of the filter basket shown in FIG. 2.

As shown in FIGS. 3 and 5, a coffee filter pod 30 contains an amount of coffee packaged within it (not shown) between first and second sheets of filter web material 31 and 32. The amount of coffee material placed within the pod 30 may include, but is not limited to about 6 to 12 grams of material. Those sheets of filter material 31 and 32 are fixed to each other about their periphery and form a pocket in between for placement of the coffee material (or tea). The sheets 31 and 32 are secured around their periphery to form a flange 35. The diameter of the circumference defined by the ledge 25 is sufficient to receive the coffee pod 30, and specifically the flange portion 35 of the pod when it is placed in the filter basket 15. In other words, the diameter of the coffee pod d1 is adapted to be approximately the same as the diameter of the circumferential circle defined by the ledge 25. When water is supplied to the brew basket, the flange 35 of the coffee pod 30 will seal to the stepped support ring that is shown as the ledge 25. Additional hot water then will pass through the coffee pod 30 to be infused by the coffee matter and then pass out through the bottom opening 23. The slope of the bottom end 22 allows for the coffee pod 30 to be drawn into the bottom portion 22, at least in part, during brewing.

In one example, the outside angle to the horizontal of the bottom portion of the cone 22 is in the range of about 60° to 75°. The inside diameter of the support ring or ledge 25 is in the range of about 55 mm to 65 mm. In one example, the inside diameter is about 60 mm.

Figure 6:
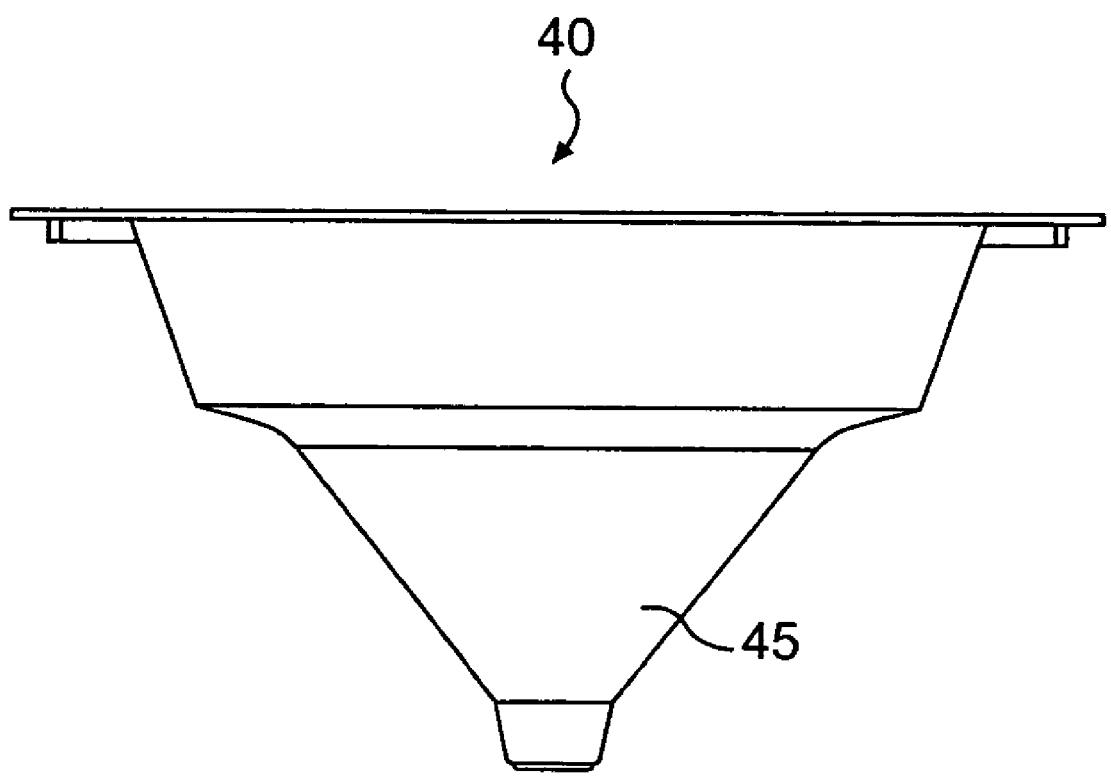
FIG. 6 is a side elevation view of an alternative geometry of a brew basket in accordance with an example of the present invention.

FIG. 6 illustrates an alternative example of a filter basket 40 where the bottom end portion 45 defines a more flat cone than that shown in FIGS. 2-5. This filter basket 40 is merely an alternative example that demonstrates that different cones and different funnel shapes may be used in accordance with the teachings herein.

Figure 7:
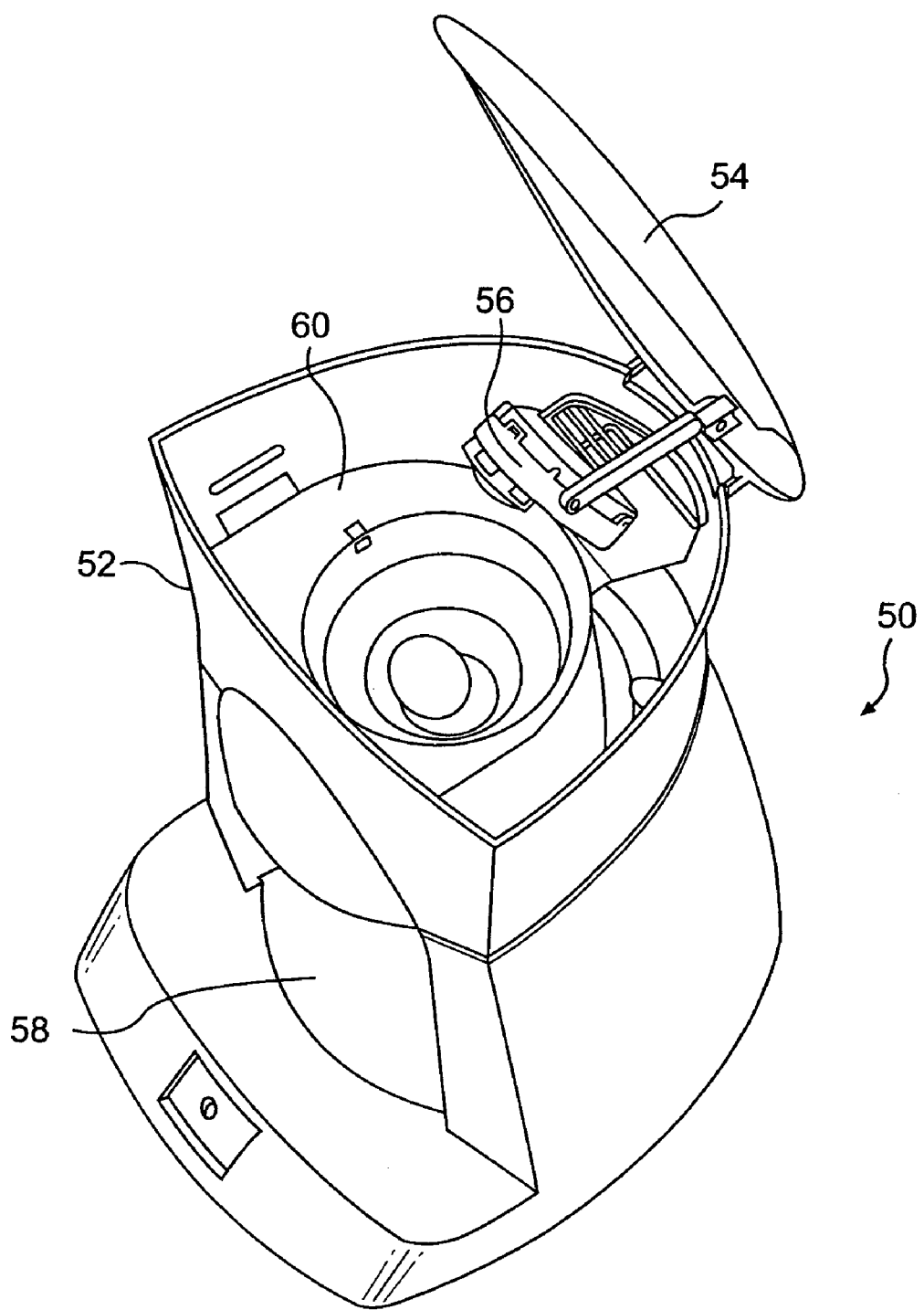
FIG. 7 is a perspective view of an alternative automatic drip coffee maker in which may be mounted a filter basket in accordance with the present invention.

FIGS. 7-10 illustrate a further example of a filter basket 60 displaying a still further different geometry from the cones shown in FIGS. 1-6. Referring first to FIG. 7, the coffee maker 50 includes the filter basket 60 that is placed into the coffee maker from the top of the coffee maker. A lid 54 is rotated open. The hot water showerhead 56 is rotatably connected to the lid 54 and raises when the lid is opened. This allows the filter basket 60 to be placed into and out of the coffee maker 50 from above. The filter basket 60 is placed inside the housing 52 of the coffee maker 50 so that the filter basket is suspended above the serving surface 58 where a coffee cup may rest and receive the infused beverage from the filter basket 60.

Figure 9:
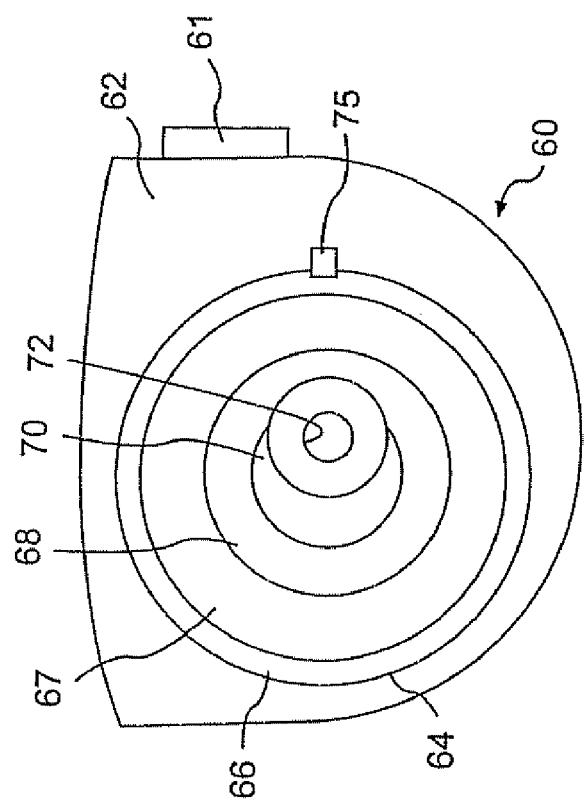
FIG. 9 is a top plan view of the filter basket shown in FIG. 8.
Figure 8:
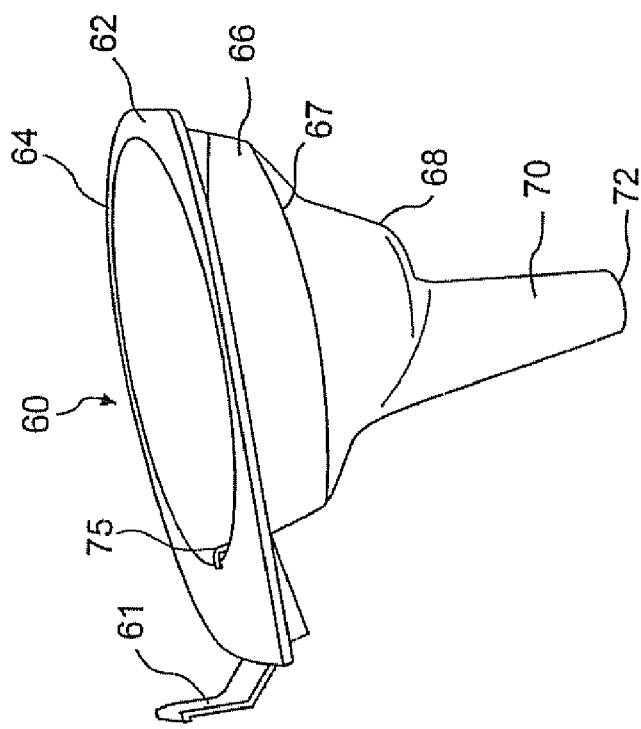
FIG. 8 is a perspective view of another example of a filter basket in accordance with the present invention.
Figure 10:
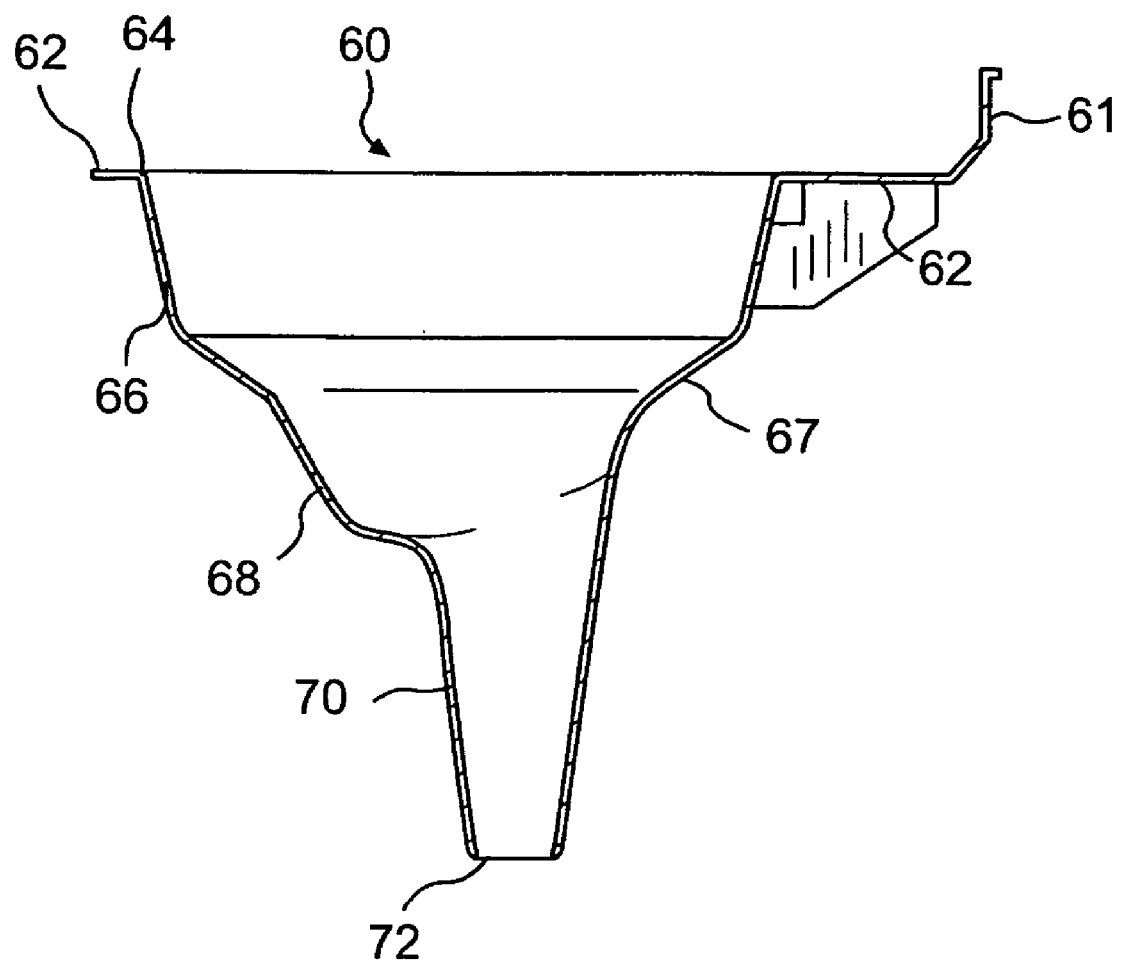
FIG. 10 is a side elevation, cross-sectional view of the filter basket shown in FIGS. 8 and 9.

Turning now to FIGS. 8-10, the filter basket 60 includes a flange 62 that supports the filter basket inside the coffee maker 50. The flange 62 has a tab 61 extending upwardly therefrom to allow user to lift up out of and insert the brew basket into the coffee maker 50. The top edge 64 of the top of the filter basket 60 defines the upper opening into which the hot water is passed into the filter basket. The conical shape of the filter basket 60 is comprised of the three parts—the upper end 66, middle portion 68, and lower end 70. There is shown a ledge 67 that is the transition between the upper end 66 and middle portion 68. The ledge 67 is a type of stepped support ring and has a relatively wide diameter to accommodate different size pod filters that may be placed into the filter basket 60. Also, the ledge 67 is shown as being sloped between the upper portion 66 and middle portion 68. This allows for the wetted pod to flow into or be drawn into, at least in part, the smaller cone shape that makes up the middle portion 68. The low end 70 of the filter basket 60 is a relatively narrow funnel having an opening defined by the bottom edge 72 of the low end 70. As shown, the low end 70 is configured off-center in the filter basket 60. In other words, the low end 70 is offset to one side of the middle portion 68 cone shape. This off centering of the low end 70 is for the sole purpose of centering the low end 70 and opening 72 above a coffee cup that would be placed on the flat portion 58 of the coffee maker 50.

Finally, this example of a filter basket 60 includes an overflow aperture 75 near the top edge 64 of the filter basket. The overflow aperture 75 prevents the unwanted leakage of water all around the top of the filter basket 60. The aperture 75 guides the overflow, by way of surface tension, down the outside of the brew basket and guides it into the cup where the brewed beverage is deposited.

EXAMPLE

The performance of existing brew basket constructions was compared to a brew basket as shown in FIGS. 7-10 (referred to in the test as the POD Basket). The other constructions were a Black and Decker "Cup at a Time" basket, a Hamilton Beach CV-1 basket, and a regular funnel. In each case, a filter pod was simply placed into the brew basket.

Quantitative Test Methodology:

For each experiment the same coffee maker (Hamilton Beach CV1) was used. The coffee weight for each was at 9 grams. The same coffee pod was used as was 7 oz. distilled water for each test. After coffee was brewed it was allowed to cool to 70 deg. F. At this temperature the conductivity was measured to determine the coffee strength (extraction). The conductivity was measured using an Oakton Instruments TDS Tester model 35661-11, calibrated with a 1000 ppm solution before testing.

The following Table 1 contains the results of five trial tests.

| | PPM measured with Conductivity meter | | | |
|---|---|---|---|---|
| TRIAL | POD Basket | Black and Decker Basket | CV-1 Basket | Actual Funnel without pressing in POD |
| 1 | 1230 | 1000 | 820 | 1140 |
| 2 | 1180 | 1190 | 870 | 1160 |
| 3 | 1150 | 1100 | 760 | 830 |
| 4 | 1220 | 950 | 810 | 1230 |
| 5 | 1250 | 560 | 850 | 760 |
| Avg. | 1206 | 960 | 822 | 1024 |
| Standard Deviation | 36 | 216 | 37 | 190 |

As is evident from the test results, the average PPM (amount of extraction) is higher and standard deviation (consistent brew) lower for the example of the invention versus prior art brew baskets. This means that use of the improved brew basket yields a better extraction and more consistent results than the prior brew baskets.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. An automatic drip coffee maker brew basket comprising:
   a hollow, funnel-shaped brew basket having a relatively wide top end and a relatively narrow bottom end, with both the top and bottom ends being open to allow a liquid to flow freely through the basket, the bottom end opening being defined by a bottom edge of the bottom end;
   a stepped support ring integral in and defining a sloped ledge around a circumference of the brew basket, wherein the circumference is below the top end and above the bottom end;
   whereby a coffee filter pod is supported on its periphery by the support ring during brewing.

2. An automatic drip coffee maker brew basket as described in claim 1, wherein the brew basket has a substantially conical shape that defines a substantially circular cross-section.

3. An automatic drip coffee maker brew basket as described in claim 2, wherein the inside diameter of the support ring is in the range of about 55 mm to 65 mm.

4. An automatic drip coffee maker brew basket as described in claim 2, wherein the inside diameter of the support ring is about 60 mm.

5. An automatic drip coffee maker brew basket as described in claim 2,
   wherein the outside angle to the horizontal of the cone is in the range of about 60 degrees-75 degrees.

6. An automatic drip coffee maker for use with a pod comprising an amount of coffee material packaged within at least first and second sheets of filter web material, wherein the sheets of filter web material are fixed to each other about their periphery and form a hollow space in between for placement of the coffee material, and the pod including a flange around the periphery where the first filter material is fixed to the second filter material;
   a hollow, funnel shaped brew basket having a relatively wide top end and a relatively narrow bottom end, with both the top and bottom ends being open to allow a liquid to flow freely through the basket, the bottom end opening being defined by an edge of the bottom end;
   a stepped support ring integral in and defining a sloped ledge around a circumference of the brew basket, wherein the circumference is below The top end and above the bottom end;
   whereby the pod is supported on its periphery by the support ring during brewing.

7. An automatic drip coffee maker as described in claim 6, wherein the brew basket has a substantially conical shape that defines substantially circular cross-section.

8. An automatic drip coffee maker as described in claim 7, wherein the inside diameter of the support ring is in the range of about 55 mm to 65 mm.

9. An automatic drip coffee maker as described in claim 7, wherein the inside diameter of the support ring is about 60 mm.

10. An automatic drip coffee maker as described in claim 7, wherein the outside angle to the horizontal of the cone is in the range of about 60°-75°.

11. An automatic drip coffee maker as described in claim 7, wherein the diameter of the pod is in the range of from about 55 mm to 65 mm.

12. An automatic drip coffee maker as described in claim 7, wherein the diameter of the pod is about 60 mm.

13. An automatic drip coffee maker as described in claim 7, wherein the flange has a width in the range of about 5 to 15 mm.

14. An automatic drip coffee maker as described in claim 6, wherein the amount of coffee material is in the range of about 6 to 12 grams.

15. An automatic drip coffee maker brew basket as described in claim 1, wherein the brew basket further comprises an overflow aperture proximate the top end of the brew basket.

16. An automatic drip coffee maker as described in claim 6, wherein the brew basket further comprises an overflow aperture proximate the top end of the brew basket.

17. An automatic drip coffeemaker brew basket as described in claim 1, wherein the inside diameter of the support ring is adapted to be approximately the same as the diameter of the coffee pod.

18. An automatic drip coffeemaker as described in claim 6, wherein the inside diameter of the support ring is adapted to be approximately the same as the diameter of the coffee pod.

* * * * *